US008280179B2

(12) United States Patent
Lin

(10) Patent No.: US 8,280,179 B2
(45) Date of Patent: Oct. 2, 2012

(54) IMAGE PROCESSING APPARATUS USING THE DIFFERENCE AMONG SCALED IMAGES AS A LAYERED IMAGE AND METHOD THEREOF

(75) Inventor: Tsung-Wei Lin, Taipei (TW)

(73) Assignee: COREL Corporation, Ottawa (CA)

( * ) Notice: Subject to any disclaimer, the term of this patent is extended or adjusted under 35 U.S.C. 154(b) by 0 days.

(21) Appl. No.: 13/082,115

(22) Filed: Apr. 7, 2011

(65) Prior Publication Data

US 2011/0194757 A1    Aug. 11, 2011

Related U.S. Application Data

(63) Continuation of application No. 11/797,526, filed on May 4, 2007, now abandoned.

(51) Int. Cl.
*G06T 3/40*        (2006.01)
*G06T 5/50*        (2006.01)
(52) U.S. Cl. ......... 382/240; 382/302; 345/650; 345/661
(58) Field of Classification Search .................. 382/240, 382/302; 345/650, 661
See application file for complete search history.

(56) References Cited

U.S. PATENT DOCUMENTS

| | | | | |
|---|---|---|---|---|
| 4,692,806 | A * | 9/1987 | Anderson et al. | 375/240.08 |
| 5,469,536 | A * | 11/1995 | Blank | 345/594 |
| 5,666,475 | A * | 9/1997 | Salesin et al. | 345/428 |
| 5,835,086 | A * | 11/1998 | Bradstreet et al. | 345/581 |
| 6,434,265 | B1 * | 8/2002 | Xiong et al. | 382/154 |
| 6,606,105 | B1 * | 8/2003 | Quartetti | 715/853 |
| 7,075,535 | B2 * | 7/2006 | Aguera Y Arcas | 345/428 |
| 7,149,358 | B2 * | 12/2006 | Langan | 382/214 |
| 7,554,543 | B2 * | 6/2009 | Aguera Y Arcas | 345/428 |
| 2004/0062420 | A1 * | 4/2004 | Rohaly | 382/107 |
| 2004/0264799 | A1 * | 12/2004 | Gallagher et al. | 382/265 |
| 2006/0038827 | A1 * | 2/2006 | Hu | 345/604 |
| 2007/0003152 | A1 * | 1/2007 | Hoppe et al. | 382/240 |

OTHER PUBLICATIONS

Willmore, Adobe® Photoshop® CS2 Studio Techniques. Adobe Press, 2005. Ch. 3, 12 & 14. Print.*
Marcotegui, et al. "Image Editing Tools Based on Multi-scale Segmentation." Proceedings of ISMM2002. (2002): 127-135. Print.*
Chang, et al. "Example-Based Color Transformation for Image and Video." Proceedings of the 3rd international conference on Computer graphics and interactive techniques in Australasia and South East Asia. (2005): 347-353. Print.*
Adelson et al. "Pyramid Methods in Image Processing." RCA Engineer. 29.6 (1984): 33-41. Print.*

(Continued)

*Primary Examiner* — Michael A Newman
(74) *Attorney, Agent, or Firm* — Patterson & Sheridan LLP

(57) ABSTRACT

The present invention is to provide an image processing apparatus using the difference among scaled images as a layered image and a method thereof, which utilize the Gaussian and Laplacian pyramid theory to convert an original image into a plurality of scaled images of different scales, and the difference among scaled images of two adjacent different scales as a layered image of the corresponding layer, so that the edge and line characteristics of a scene of the original image for each layered image can be displayed in different levels sequentially from a clear level to a vague level, and provide a layered image display interface and an image characteristic editing interface for users to examine each layered image through the layered image display interface and edit or perform special effect to each layered image, so as to simulate different visual effects based on different vision models.

13 Claims, 16 Drawing Sheets

OTHER PUBLICATIONS

Willmore Adobe® Photoshop® CS2 Studio Techniques. Adobe Press, 2005. Ch. 3, 12 & 14. Print.*

Adelson et al "Pyramid Methods in Image Processing" RCA Engineer, vol. 29, No. 6, (1984) pp. 33-41 (Print).

Willmore, Adobe Photoshop CS2 Studio Techniques, Adobe Press, 2005, Ch 3, 12 & 14 (Print).

Marcoteugi et al, "Image Editing Tools based upon Multi-Scale Segmentation", Proc. ISMM2002 (2002) pp. 127-135 IPrint).

Chang et al, "Example Based Color Transformation for Image and Video", Proc. 3rd Int. Conf. on Computer Graphics and Interactive Techniques in Australasia and South East Asia (2005) pp. 347-353 (Print).

* cited by examiner

IMAGE PROCESSING APPARATUS USING THE DIFFERENCE AMONG SCALED IMAGES AS A LAYERED IMAGE AND METHOD THEREOF

FIELD OF THE INVENTION

The present invention relates to an image processing apparatus and method, more particularly to an image processing apparatus and method by using the difference among scaled images as a layered image for enabling a user to edit or perform special effect to the edge and line characteristics of the layered images of a scene of an original image, so as to simulate different visual effects based on different vision models.

BACKGROUND OF THE INVENTION

In general, an image processing software usually comes with a layer processing function that allows each image to be resided at a layer all the time as shown in FIG. 1, and thus users usually need to create a layer 111, 121 or add a layer before processing (including editing or composing) an image 110, 120 in a file, and a canvas 130 is situated at the lowest layer of all layers 111, 121 but the canvas 130 is not a layer by itself. Therefore, the layers 111, 121 are similar to a stack of transparent films, and the layers 111, 121 can help a user to organize the images 110, 120 in a file, so that the user can edit the image 110 on the layer 111 without affecting the image 120 on the other layer 121. If the layer 111 contains no image 110, then the user will be able to see the image 120 on the layer 121 through the layer 111. In addition, a user can view the stack sequence of the layers and images on a layer display panel provided by different image processing software, and such stack sequence is also the sequence of images appeared in the document. In general, various different image processing software stack the layers according to such sequence, and the later produced layer is placed at the top of the stack, and the stack sequence determines how to stack an image of a layer on an image of another layer, such that users can rearrange the sequence of layers and images through a control interface of the image processing software to change the content of the images in a file.

Referring to FIG. 2 for an image processing software called "Photoshop" available in the market, a user can create two images 210, 220 on two separate layers from a layer display panel provided by the image processing software, if the user wants to compose two images 210, 220. A composed image 310 is created as shown in FIG. 3, after the size and position of each image 210, 220 are adjusted according to the user's requirements. Referring to FIG. 4, a user can click on an [Add Mask] button 450 to create a mask 440 for a first image 410 on the first layer 411, if the user wants to edit the first image 410 on the layer display panel 400. In FIG. 5, a brush tool 471 is selected from a tool menu 470. In FIGS. 5 and 6, the selected brush tool 471 is used to paint the mask 440, such that the dark color position of a second image 420 at a second layer 421 corresponding to the mask 440 is set to a black color. If the user selects to apply a gentle pressure of the brush tool 471, the user needs to adjust the transparency of the black color, such that the image 410 (or foreground) at the first layer 411 is merged with the second image 420 (or background) at the second layer 421 to form a composed image 430 with the best composition effect.

From the description above, the image processing software available in the market can use the concept and technique of a layer to provide a tool for editing the image on each layer, or rearranging the image sequence of each layer, and can use the image composition technology to simulate a digital dark room, for editing and composing images, but these image processing software cannot show the effect of different vision models for the image.

As LMS is a color space used for indicating the response of three kinds of cones of human eyes, which refer to the sensitivity of color lights with a long wavelength, a medium wavelength and a short wavelength respectively, and the cross-section of a human retinal-cortical system includes complicated neural links. Only the LMS cone is known in general, but the profound structure of the retinal-cortical system still includes tree-structured constructions of cells strains, and the root of these constructions link several cones together to form a so-called "ganglion cell", for making several receptive fields. Although neurophysists already have relatively high understanding on the visual imaging method of a retinal-cortical system of human eyes, yet this understanding is limited to an edge enhancement effect only, since the ganglion cells of different sizes are distributed increasingly denser from a fovea to the peripheral areas of a cornea, and thus the basic visual imaging principle decreases the vision from the center of the visual line to the peripheral areas. While human eyes are viewing a scene, an image sensed by a fixation point or a perceptual field of an eye cannot be the same as a camera or camcorder as shown in FIG. 7 for treating each position on the image 510 the same way. In fact, human eyes as shown in FIG. 8 only perceive an area (such as the cross area) interested to the eyes for a longer time, but the fixation point or perceptive field varies and the level of fixation is different. As a result, an image 530 with the effect of a different vision model can be produced in an imaging area of a human brain as shown in FIG. 9.

In recent years, unsharp-masking (USM) has been used extensively in different traditional image processing software and provided for users to perform special effects for an image. Regardless of the computation program used by these image processing software, the core technology uses the Laplacian of Gaussian edge enhancement technology and concept to simulate the effects of a receptive field of a human vision, but the computation carries out a single-level processing for the image only, and it cannot show the effect of different vision models for the image.

SUMMARY OF THE INVENTION

In view of the foregoing shortcomings of the prior art, the inventor of the present invention based on years of experience in the related industry to conduct extensive researches and experiments, and finally developed an image processing apparatus using the difference among scaled images as a layered image and its method in accordance with the present invention.

It is a primary objective of the present invention to provide an image processing apparatus using the difference among scaled images as a layered image and its method to simulate an image with an effect of different vision models of the same scene in an imaging area of a human brain according to the fixation point, perceptive field or level of fixation of a human eye that views the scene, while a user is editing the image.

Another objective of the present invention is to use the Gaussian and Laplacian pyramid theory to convert an original image into a plurality of scaled images of different scales, and the difference among scaled images of two adjacent different scales as a layered image of the corresponding layer, so that the edge and line characteristics of a scene of the original image for each layered image can be displayed in different levels sequentially from a clear level to a vague level, and provide a layered image display interface and an image characteristic editing interface for users to examine each layered image through the layered image display interface. According to actual requirements, the image characteristic editing interface is used for editing or performing another special effect for each layered image, so as to simulate different visual effects based on different vision models.

A further objective of the present invention is to provide a layered image editing interface, and the layered image editing interface includes a layered image editing window for displaying each editing layered image or a composed image composed of the layered images, and its periphery has at least one layered image characteristic adjusting button for users to click to adjust the contrast or Gaussian variance of the layered image; at least one size adjusting button for users to click to zoom in or out the layered image or composed image; and at least one image composition switch button for users to click to switch the layered image editing window and select each layered image or composed image, so that a user can click the image composition switch button to browse each editing layered image or composed image.

Another further objective of the present invention is to provide an image output interface, for integrating the edited layered image into a new image, and converting the new image into an image file having a specific format for saving, displaying or printing the image file.

To make it easier for our examiner to understand the objective, technical characteristics and effects of the present invention, preferred embodiment will be described with accompanying drawings as follows:

DETAILED DESCRIPTION OF THE PREFERRED EMBODIMENTS

Figure 1:
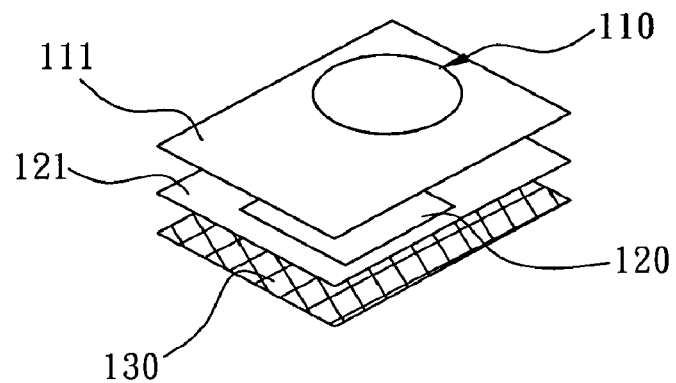
FIG. 1 is a schematic view of images and layers in various different image files of a prior art.
Figure 2:
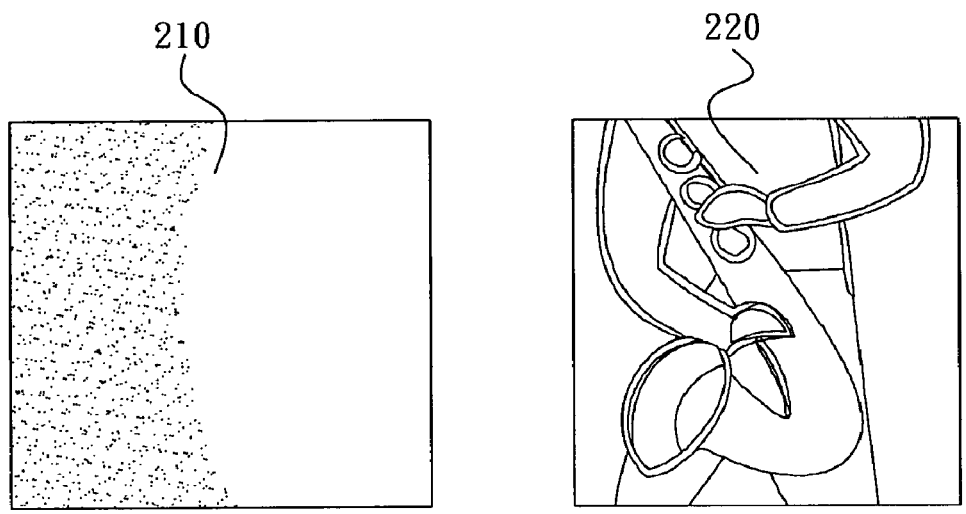
FIG. 2 is a schematic view of two images.
Figure 3:
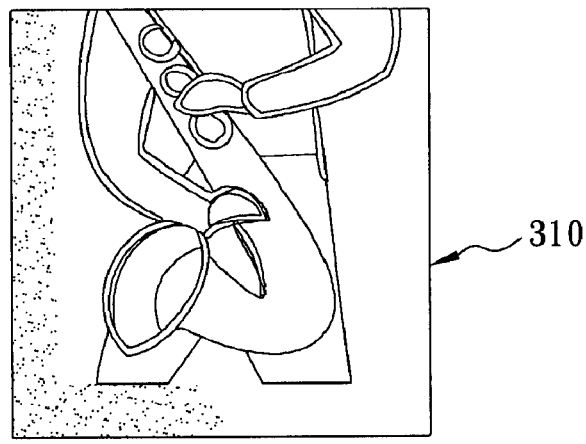
FIG. 3 is a schematic view of using Photoshop image processing software to compose two images as depicted in FIG. 2 into one image.
Figure 4:
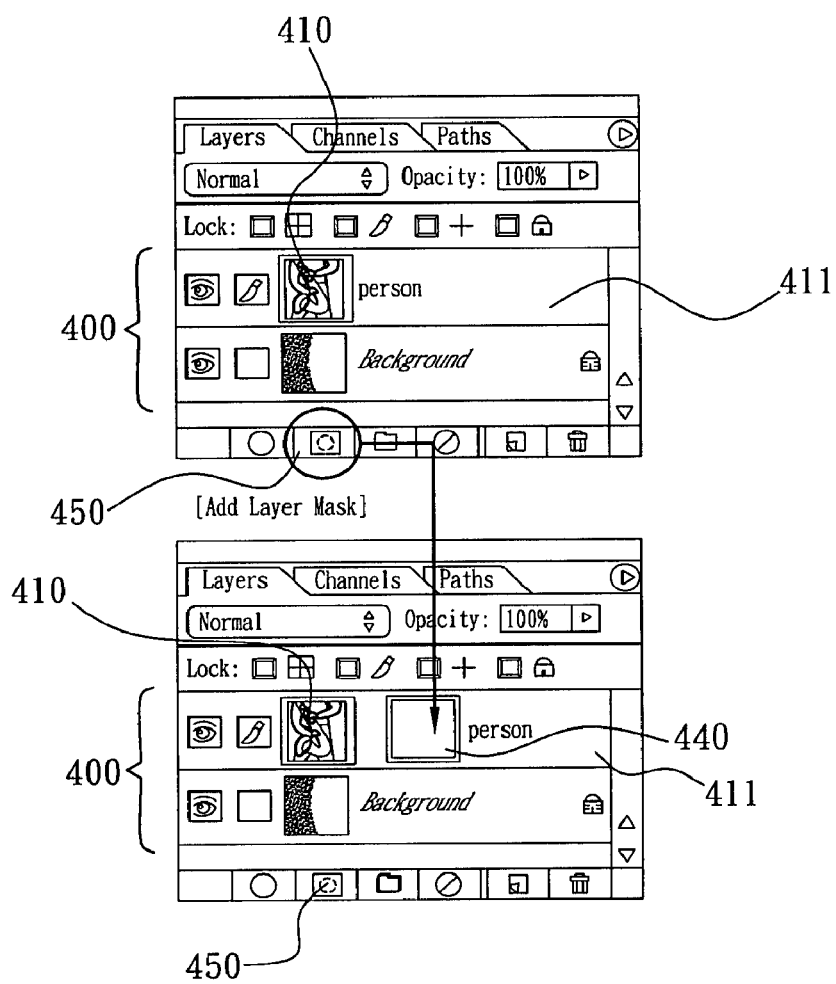
FIG. 4 is a schematic view of using Photoshop image processing software to add a mask operation to the composed image as depicted in FIG. 3.
Figure 5:
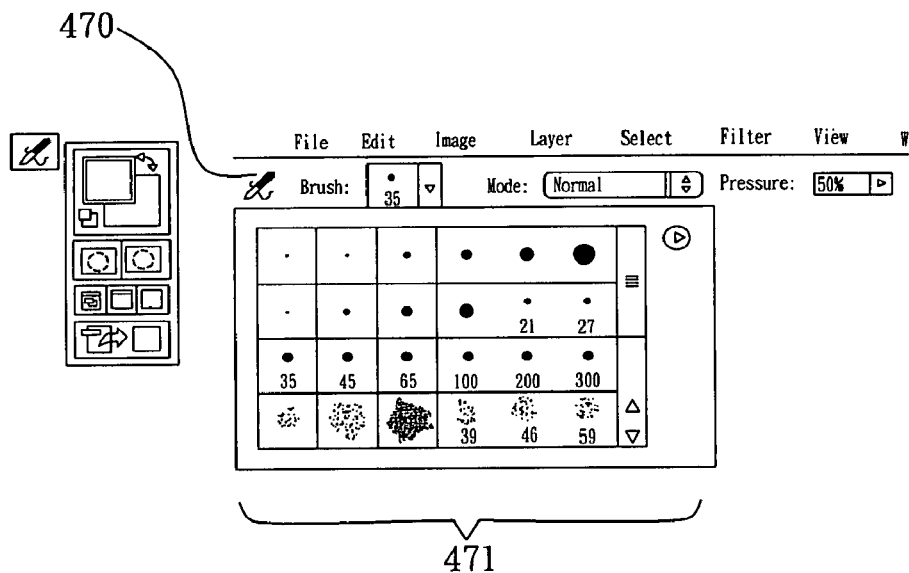
FIG. 5 is a schematic view of a tool menu of Photoshop image processing software.
Figure 6:
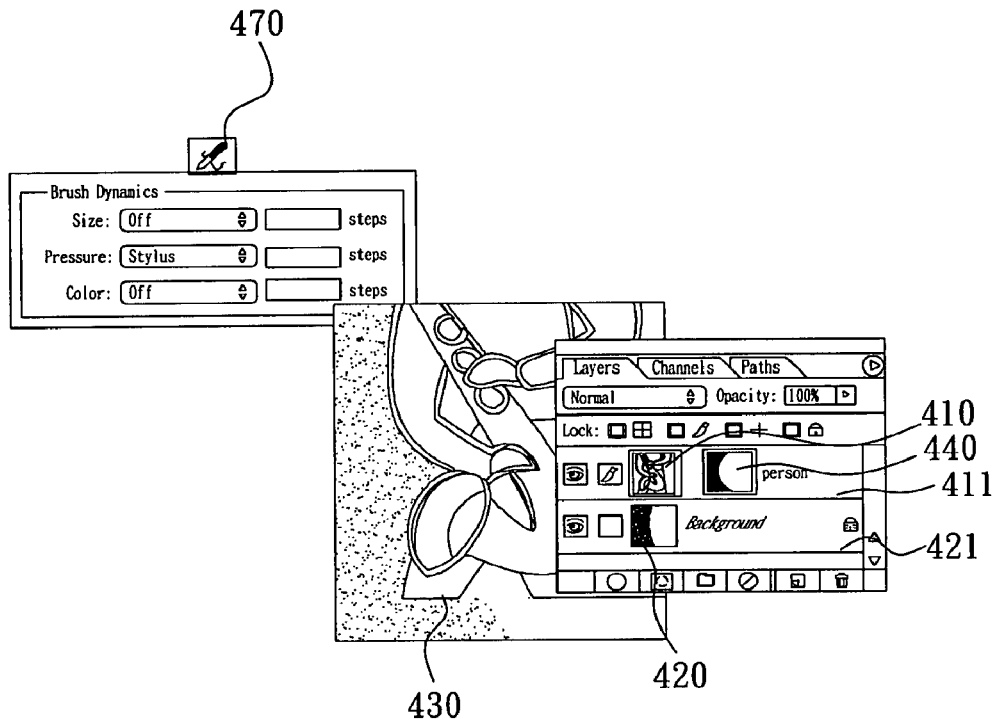
FIG. 6 is a schematic view of using Photoshop image processing software to add a new mask to the image as depicted in FIG. 3 for a composition.
Figure 7:
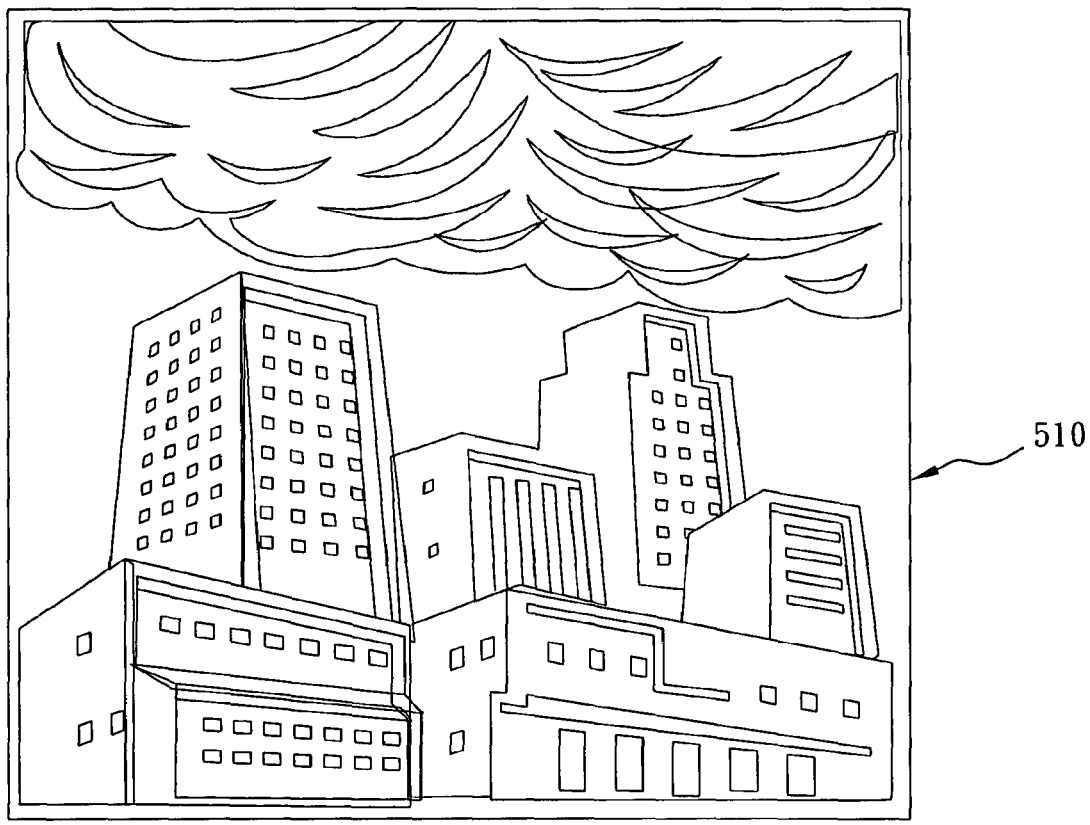
FIG. 7 is a schematic view of a scene captured by a camera or a video camera.
Figure 8:
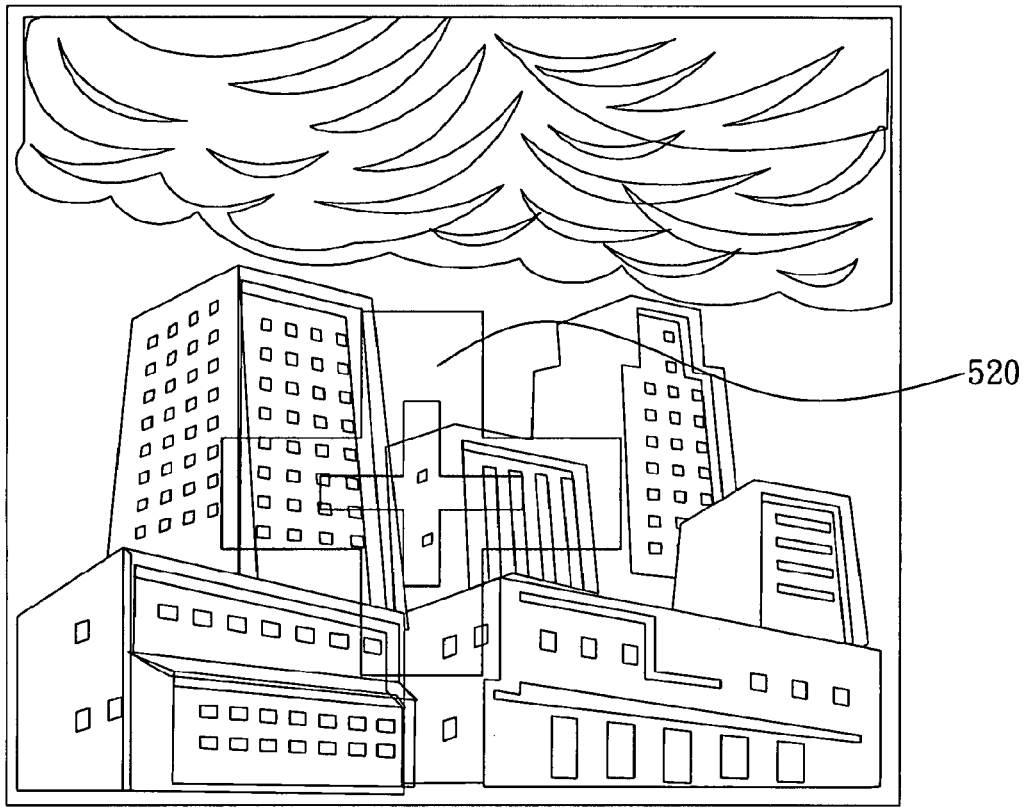
FIG. 8 is a schematic view of an area (such as a cross area) of a certain scene attracted to human eyes.
Figure 9:
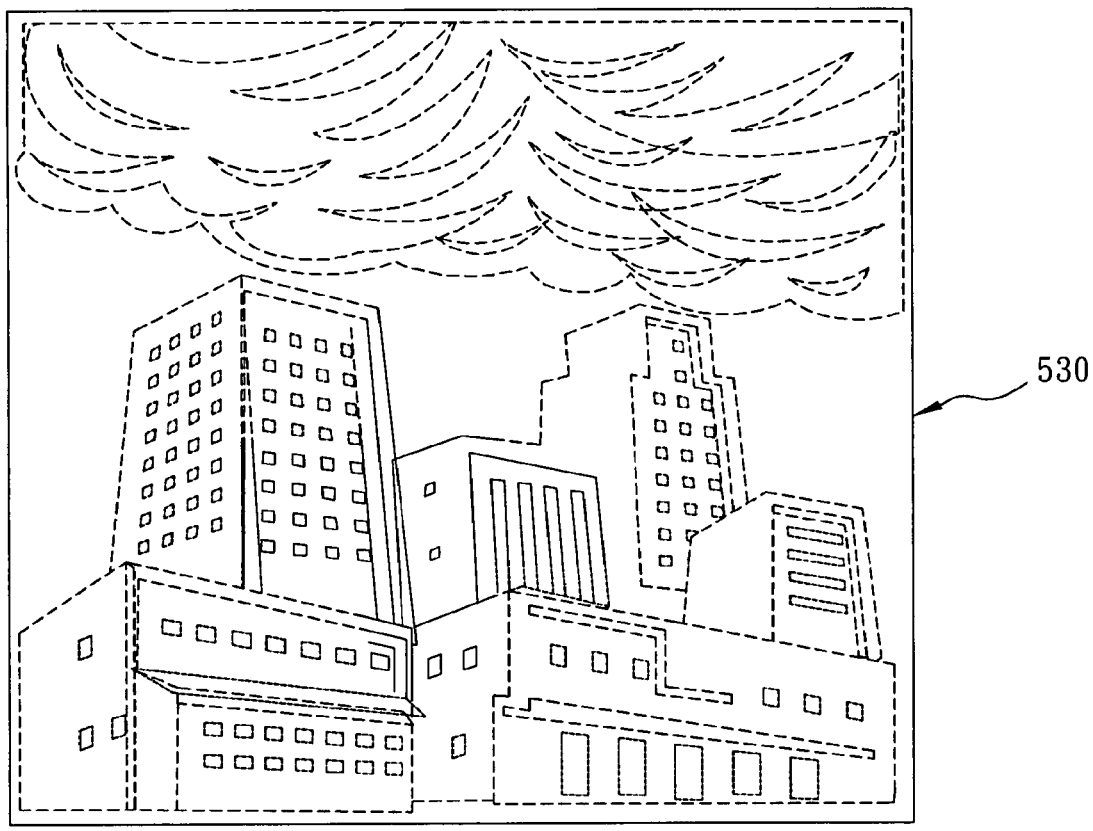
FIG. 9 is a schematic view of simulating an image with an area interested to and viewed by a human eye as shown in FIG. 8 for a longer time.

In general, a human visual system is used for identifying an edge and a line of an image, which is an easy task for many occasions except for a camera system. Even though many relatively complicated theories and algorithms have been adopted, it is not easy to simulate the recognition capability of a human visual system due to the following factors:

(1) An error caused by the quantization of the original image and a detected noise will cause an area of an edge or a line of the image to disappear as the detected brightness varies;

(2) The precise positions of an edge and a line of an image may be affected by quantized errors and noises to produce a deviation; and (3) An edge and a line of an object in an image should show the change of a sharp brightness theoretically, due to the high-frequency characteristic, and thus any smooth filtered wave for reducing the noise of an image will cause a blurring to the signals at the edge areas. Since a vast majority of edge detection methods adopt the derivative processing, not only amplifying the high-frequency signals, but also amplifying the noises as well, therefore it is necessary to perform a smoothing filter to the signals, and the smoothing filter effect depends on the size of the filter and the scale of the filtered wave. The larger the scale of filter, the broader is the range of brightness, but the precision detected at the edge positions also becomes lower as well. The smaller the scale of filter, the more precise is the edge position, but it is easier to generate errors at the edge points. Furthermore, the influence on different scaled images will be different, and thus it is not easy to appropriately find the best scale for all edges of an image with all edges, not even mentioning about finding an appropriate scale of all images.

In the present image processing area, the generally acknowledged best edge detection method is called a multi-scale edge detection, and the main concept of the method is to apply a smoothing filter (such as a Gaussian filter) with different scales to perform a convolution with the original image to obtain a filtered image with a different scale and then take the edge of the filtered image for every scale, and finally stack all edges with all scales to form an edge image.

As an object can be expressed in different scales and displayed in an image. For instance, if a camera is shooting a photograph of a person walking towards the camera and capturing the images continuously, the scale of a human face falls within a range of size from 3×3 pixels to 300×300 pixels or even a larger range for a plurality of captured images. As the scale of the human face varies, a change of characteristics of the human face will show up in the captured images, which is equivalent to the characteristics of the human face being changed continuously on the photographer's retina, so that the photographer's visual cortex at a high level perception area senses the quantum jumps to form visual models with different scales of a different generation.

Figure 10:
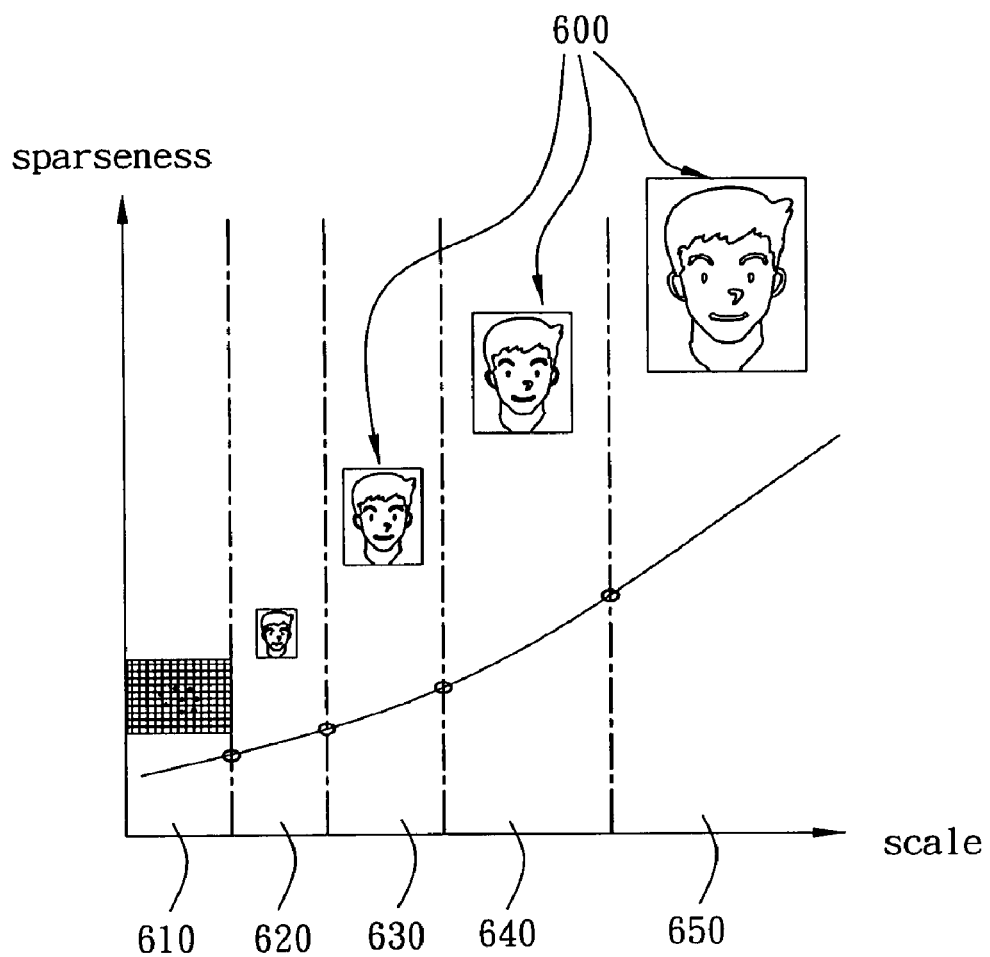
FIG. 10 is a schematic view of simulating five visual model spaces according to human vision sensing experience.
Figure 11:
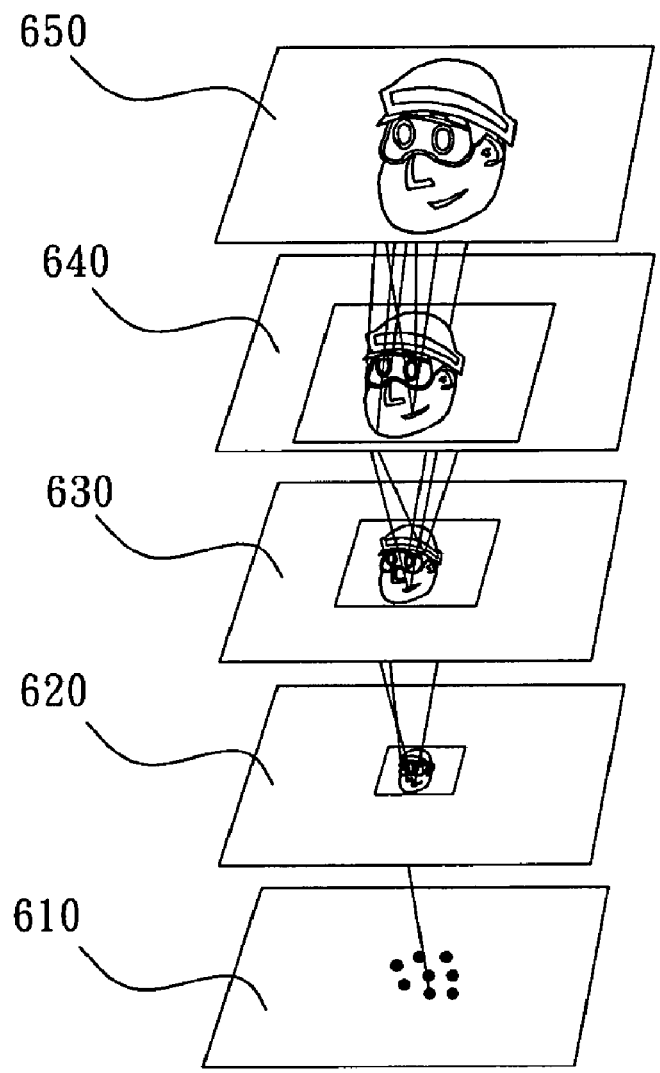
FIG. 11 is a schematic view of five levels of visual model spaces as shown in FIG. 10.

Referring to FIGS. 10 and 11, the complexity of a graph structure will be increased if the size of an image 600 is enlarged, so that the characteristics of the image 600 become more significant. If a different generation model with a different scale can be created, then a series of models can be used for defining perceptual model spaces. From the experience of human perceptual sensing, the perceptual model spaces can be defined into five major regimes:

(1) A texture regime 610: If a viewer views a person at a distance, the viewer cannot identify an image of the human face of that person easily, and thus the color of skin is generally identified to segment the human face in an image;

(2) A PCA regime 620: This regime was proven as a regime capable of showing the characteristics of a scene of a midscale image the best;

(3) A parts regime 630: This regime has a higher resolution for clearly identifying the image with five face features (including eyes, nose and mouths), and thus it can identify the movements of the five face features (including the closing or opening movement of an eye or a nose);

(4) A sketch regime 640: This regime has a much higher resolution, for displaying characteristics in more details to identify the five human face features including eyelids, eyebrows, and crow's feet; and (5) A super-resolution regime 650: This regime has a much higher resolution for displaying characteristics in more details.

Figure 12:
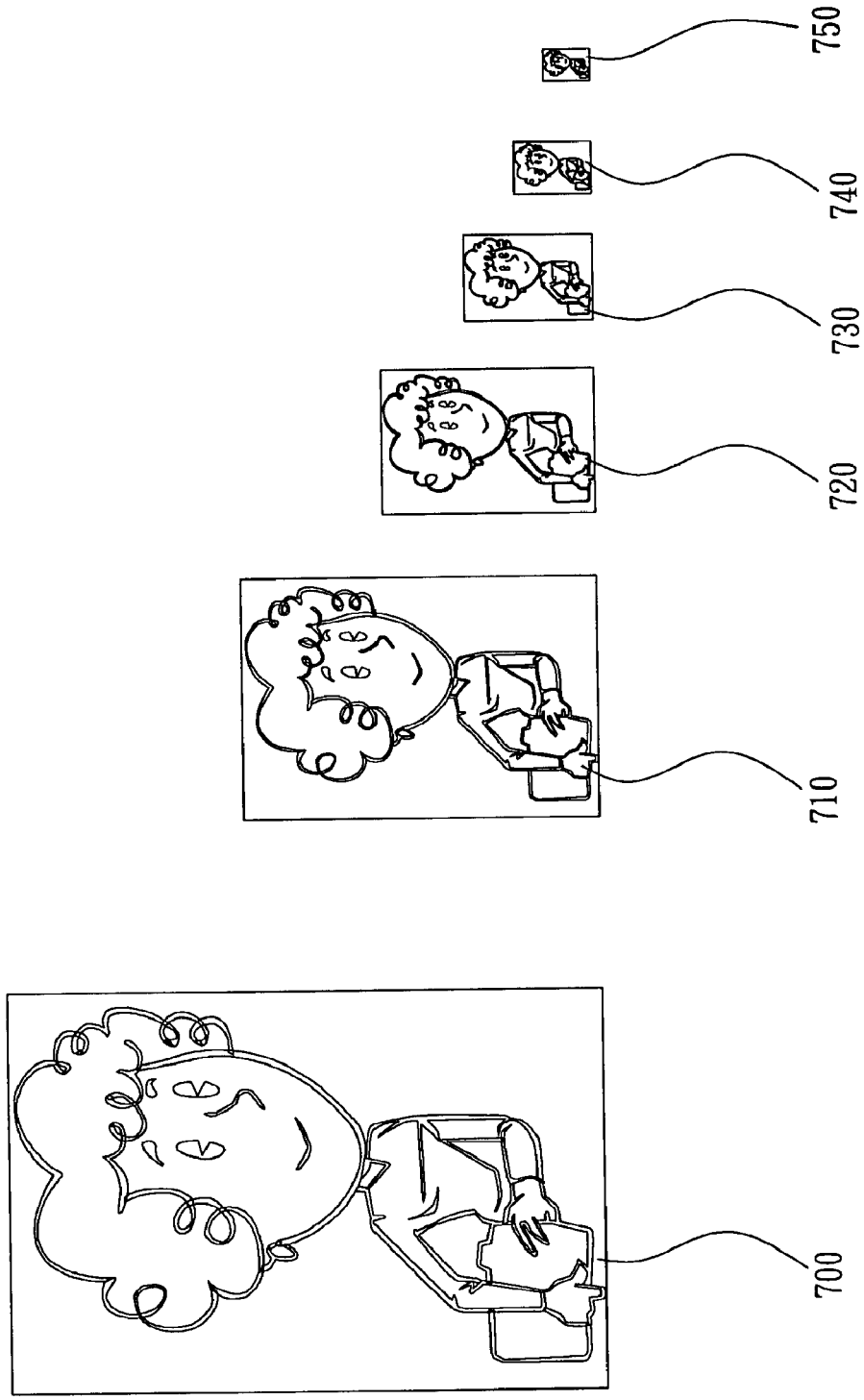
FIG. 12 is a schematic view of converting an original image into a plurality of scaled images of different scales by using the Gaussian and Laplacian pyramid theory.
Figure 13:
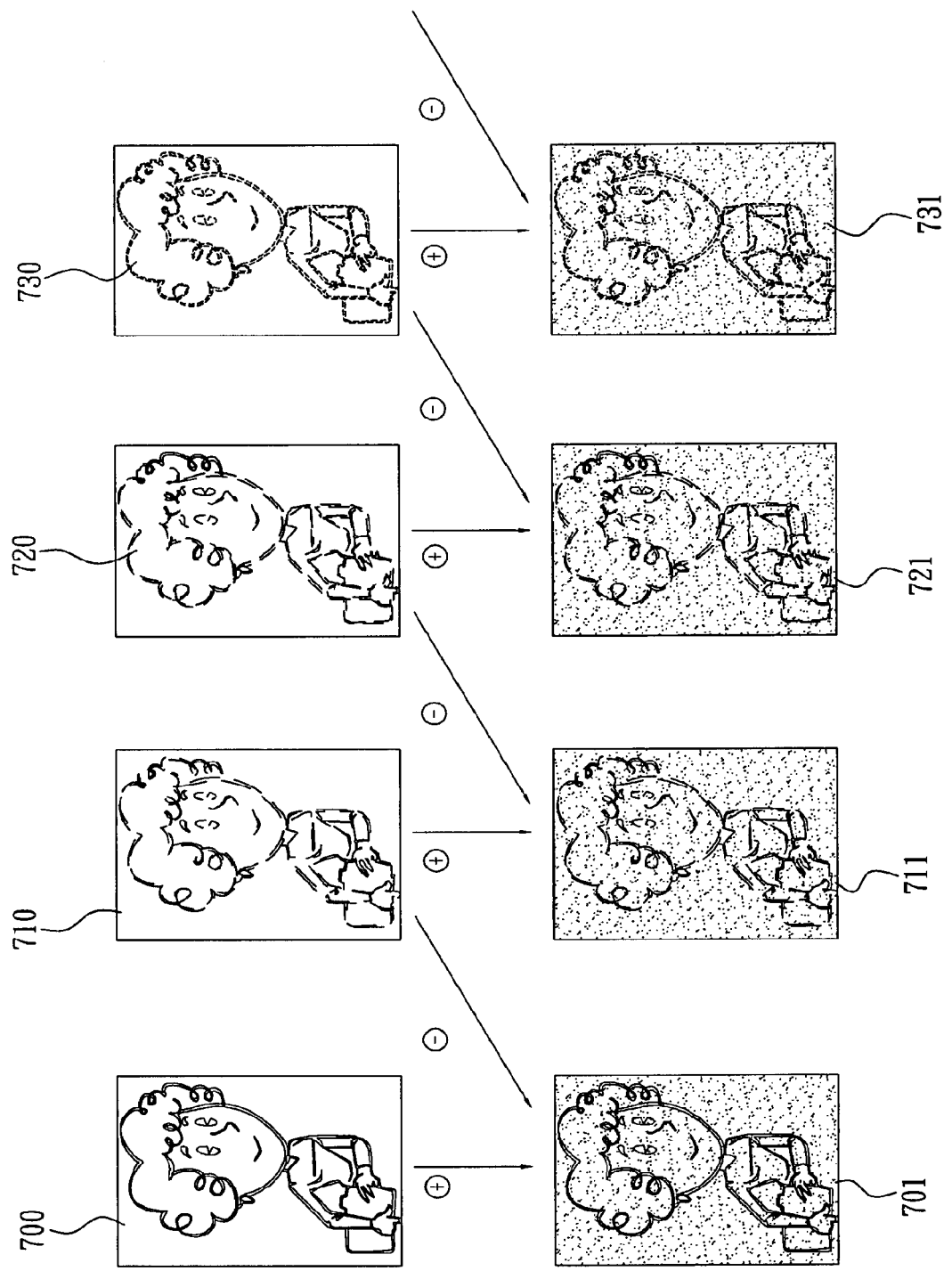
FIG. 13 is a schematic view of using an image difference among scaled images of two adjacent different scales to compute a layered image corresponding to a layer.

From the description above, any image can generate a different visual model according to a different scale of its perceptual space. The present invention adopts this concept together with the Gaussian and Laplacian pyramid theory as illustrated in FIG. 12 to convert an original image into a plurality of scaled images 700, 710, 720, 730, 740, 750 in a visual model with a different scale (as shown in FIG. 13,) and the image difference among scaled images 700, 710, 720, 730 of two adjacent different scales is used for the computation, and a computed image difference is used as a layered image 701, 711, 721, 731 of the corresponding layer, such that each layered image 701, 711, 721, 731 can be shown in a sequence of different levels from a clear level to a vague level for displaying the characteristics of an edge and a line of the original image. The present invention also provides a layered image display interface and an image characteristic editing interface, so that a user can examine each layered image 701, 711, 721, 731 in a visual model of a different scale of the original image through the layered image display interface, and edit or perform a special effect for each layered image 701, 711, 721, 731 through the image characteristic editing interface, so as to simulate different visual effects based on different vision models and the user's requirements.

It is noteworthy to point out that the mathematical algorithm for computing the image difference among scaled images of two adjacent different scales have been disclosed in many technical literatures and journals. These algorithms vary according to actual needs and objectives, but the basic algorithm generally adopts the visual model of the Gaussian and Laplacian pyramid theory to obtain the user's expected edge and line characteristics of an original image in a visual model of a different scale. Since these algorithms and mathematical models are not intended to be covered in the patent claims of the present invention, therefore they will not be described here.

Figure 14:
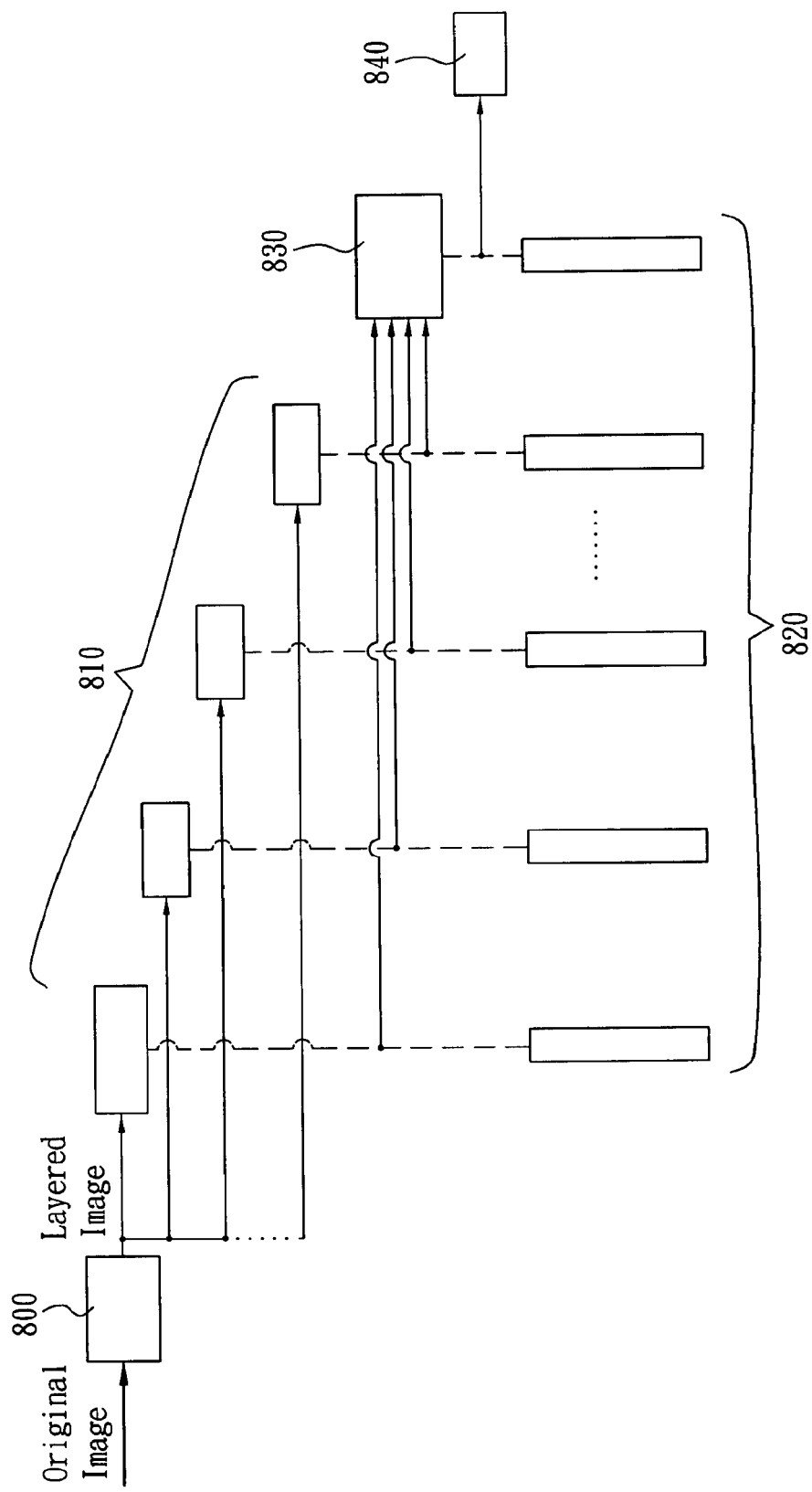
FIG. 14 is a schematic view of a structure of an image processing apparatus in accordance with a preferred embodiment of the present invention.
Figure 17:
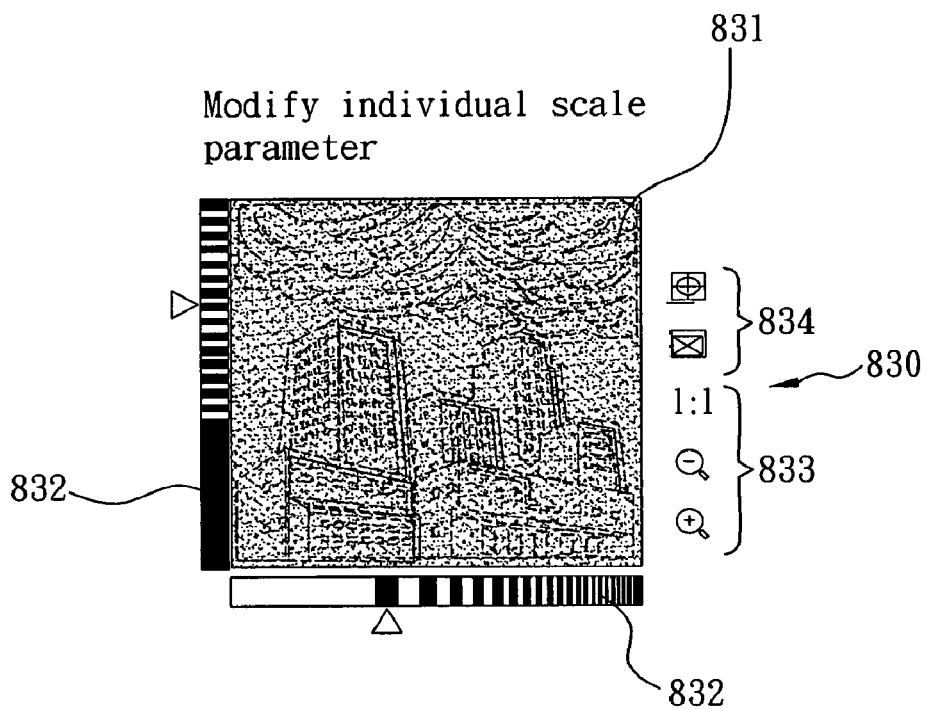
FIG. 17 is a schematic view of a layered image editing interface of an image processing apparatus as depicted in FIG. 14.

In a preferred embodiment of the present invention as shown in FIG. 14, the image processing apparatus includes the following interfaces:

(1) A scaled image conversion interface 800: This interface as shown in FIG. 12 is provided for reading an original image and converting the original image into a plurality of scaled images 700, 710, 720, 730, 740, 750 in a visual model of a different scale. In FIG. 13, an image difference among scaled images 700, 710, 720, 730 of two adjacent different scales is computed and used as a layered image 701, 711, 721, 731 of a corresponding layer, such that each layered image 701, 711, 721, 731 can be shown in a sequence of different levels from a clear level to a vague level for displaying the characteristics including an edge and a line of the original image;

(2) A layered image display interface 810: The layered image display interface 810 as shown in FIG. 15 comprises a plurality of layer control panels 811, each having a layer display window 812 and an editing start button 813, wherein the layer display window 812 is provided for displaying a layered image of a corresponding layer, such that a user can examine a layered image in a visual model with a different scale in the original image through the layer display window 812, and determining whether or not to edit or perform a special effect for each layered image; and the editing start button 813 is provided for starting an editing program that allows users to edit a layered image by the editing program displayed on the layer display window 812;

(3) An image characteristic editing interface 820: The image characteristic editing interface 820 as shown in FIG. 16 comprises a plurality of image characteristic menus 821 for users to click to edit and adjust the characteristics including contrast, highlight, midtone, shadow and white balance of the layered image of a started editing program;

(4) A layered image editing interface 830: The layered image editing interface 830 as shown in FIG. 17 comprises a layered image editing window 831 for displaying each editing layered image or a composed image composed of the layered images; at least one layered image characteristic adjusting button 832 disposed at the periphery of the layered image editing interface 830 for users to click to adjust the contrast or Gaussian variance of the layered image; at least one size adjusting button 833 for users to click to adjust the process of zooming in or out the layered image or the composed image; and at least one image composition switch button 834 for users to click to switch the layered image editing window 831 to select and show each layered image or composed image, such that a user can click the image composition switch button 834 to browse each editing layered image or composed image; and (5) An image output interface 840: The image output interface 840 is provided for integrating each edited layered image into a new image as shown in FIG. 14 and converting the new image into an image file having a specific format for saving, displaying and printing the image file.

Figure 15:
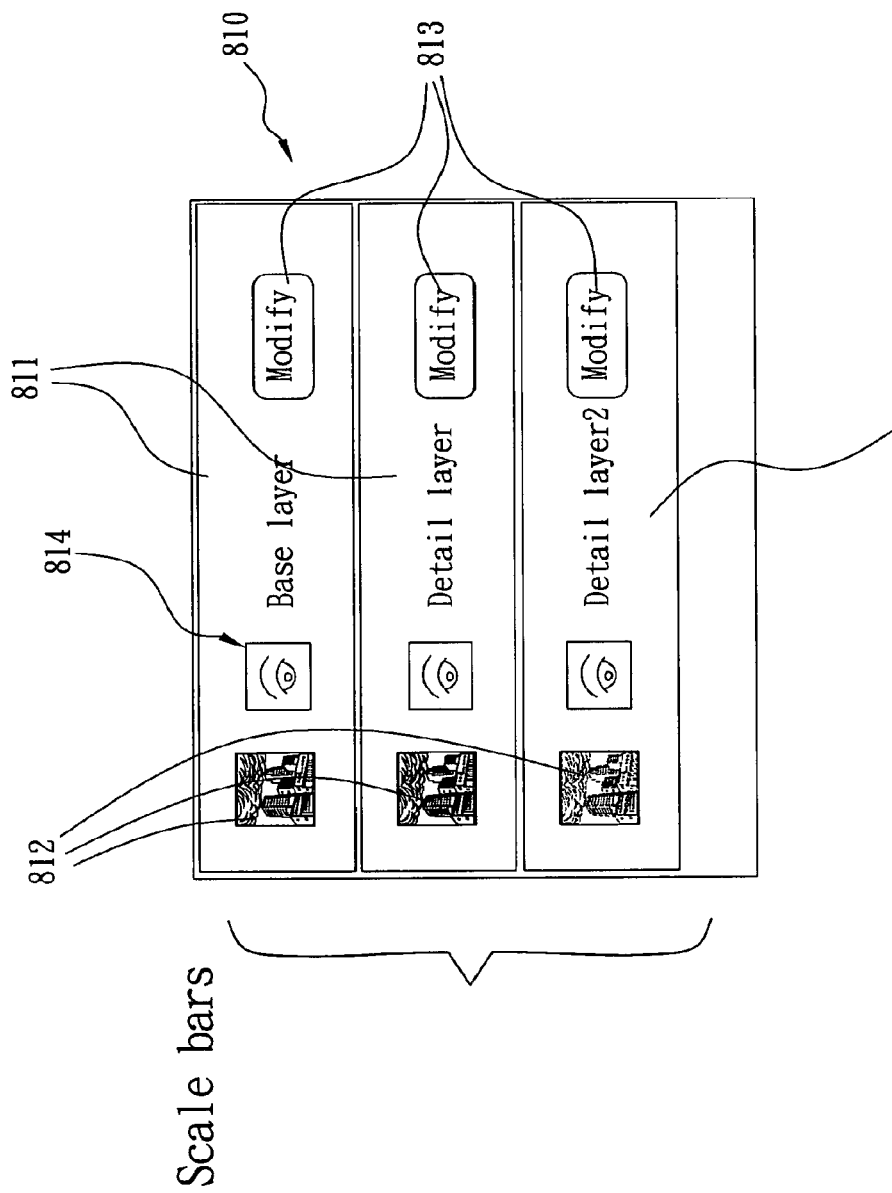
FIG. 15 is a schematic view of a layered image display interface of an image processing apparatus as depicted in FIG. 14.

Referring to FIGS. 15 and 17 for another preferred embodiment of the present invention, each layer control panel 811 further installs a layer display button 814 for users to click to control whether or not to display a corresponding layered image in the layered image editing window 831. Therefore, users can click a layer display button 814 on the layer control panel 811 according to actual requirements to select to open or close the corresponding layered image in the layer control panel 811, and click an editing start button 813 of the layer control panel 811 to determine editing or performing a special effect for the layered images.

Figure 16:
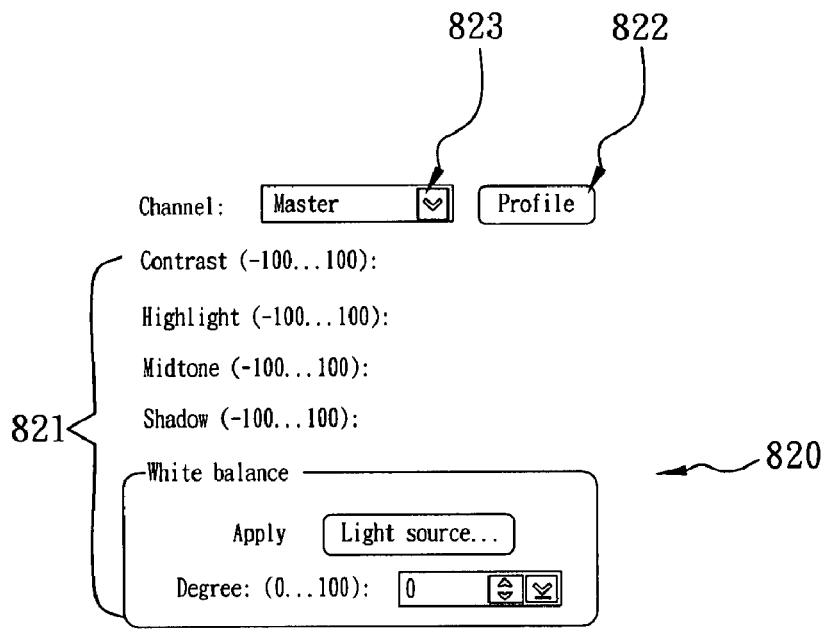
FIG. 16 is a schematic view of an image characteristic editing interface of an image processing apparatus as depicted in FIG. 14.
Figure 18:
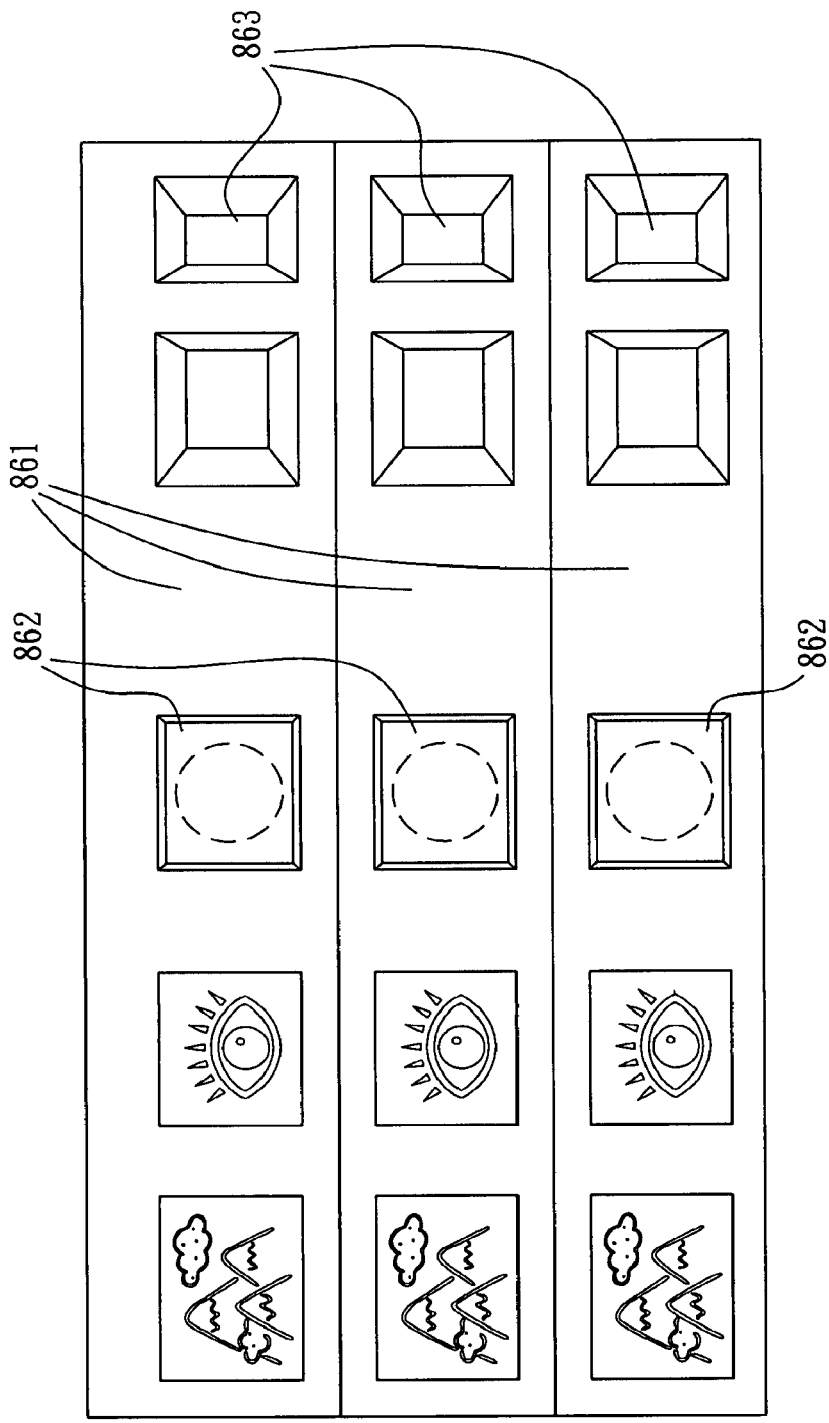
FIG. 18 is a schematic view of a layered image display interface in accordance with a preferred embodiment of the present invention.

Referring to FIGS. 16 and 18 for another preferred embodiment of the present invention, each layer control panel 861 further adds a mask display window 862 and a mask menu 863, wherein the mask menu 863 is provided for users to click the desired mask and display the mask on the mask display window 862, for displaying a mask on a corresponding layer, such that users can click a plurality of image characteristic menus 821 in the image characteristic editing interface 820 to edit the mask.

Figure 19:
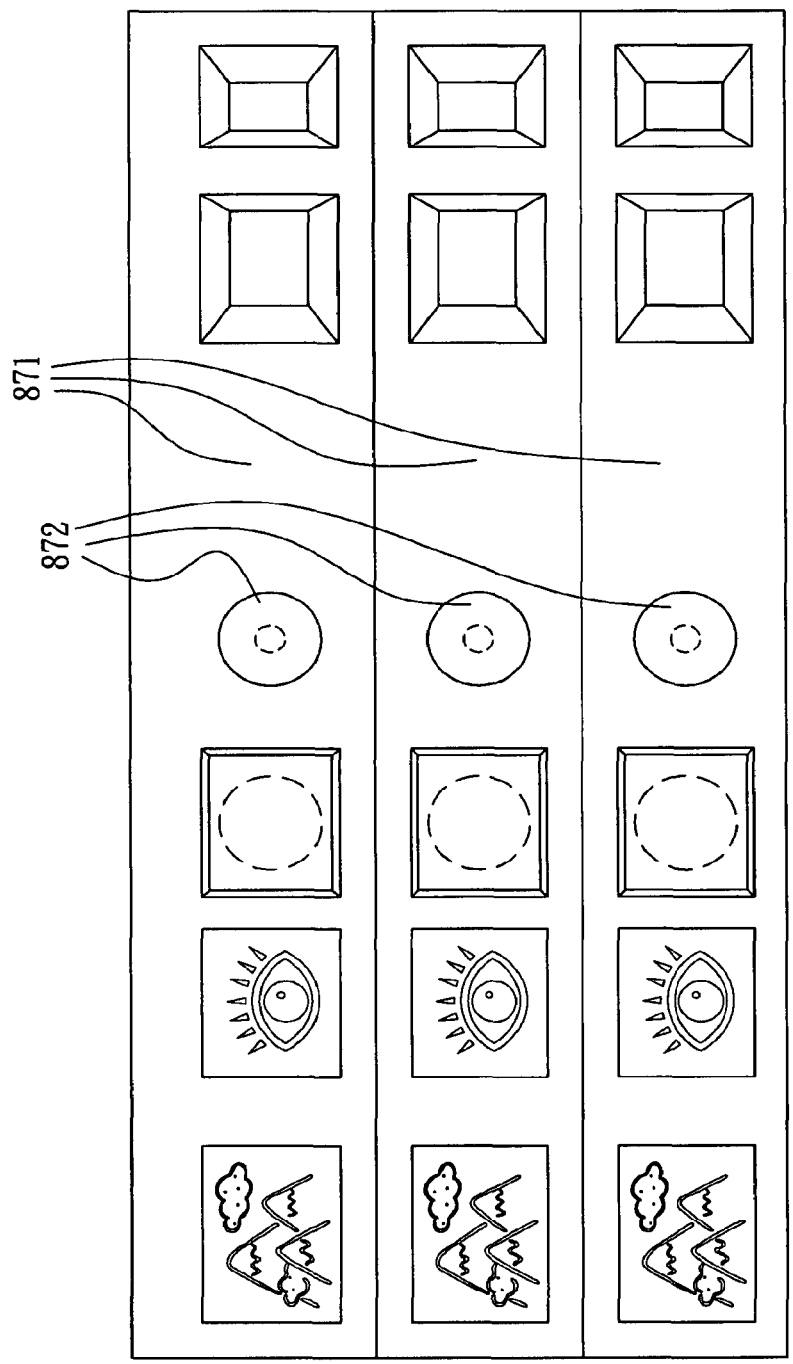
FIG. 19 is a schematic view of a layer control panel in accordance with another preferred embodiment of the present invention.

Referring to FIGS. 17 and 19 for another preferred embodiment of the present invention, each layer control panel 871 adds a mask display button 872 for users to click to control whether or not to display the mask in the layered image editing window 831.

Referring to FIG. 16 for another preferred embodiment of the present invention, the image characteristic editing interface 820 further adds a profile menu 822, for users to click, to determine whether or not to perform an access by the existing profile of the layered image.

In another preferred embodiment of the present invention as shown in FIG. 16, the image characteristic editing interface 820 adds a LMS channel menu 823, for users to click to select a LMS channel.

Figure 20:
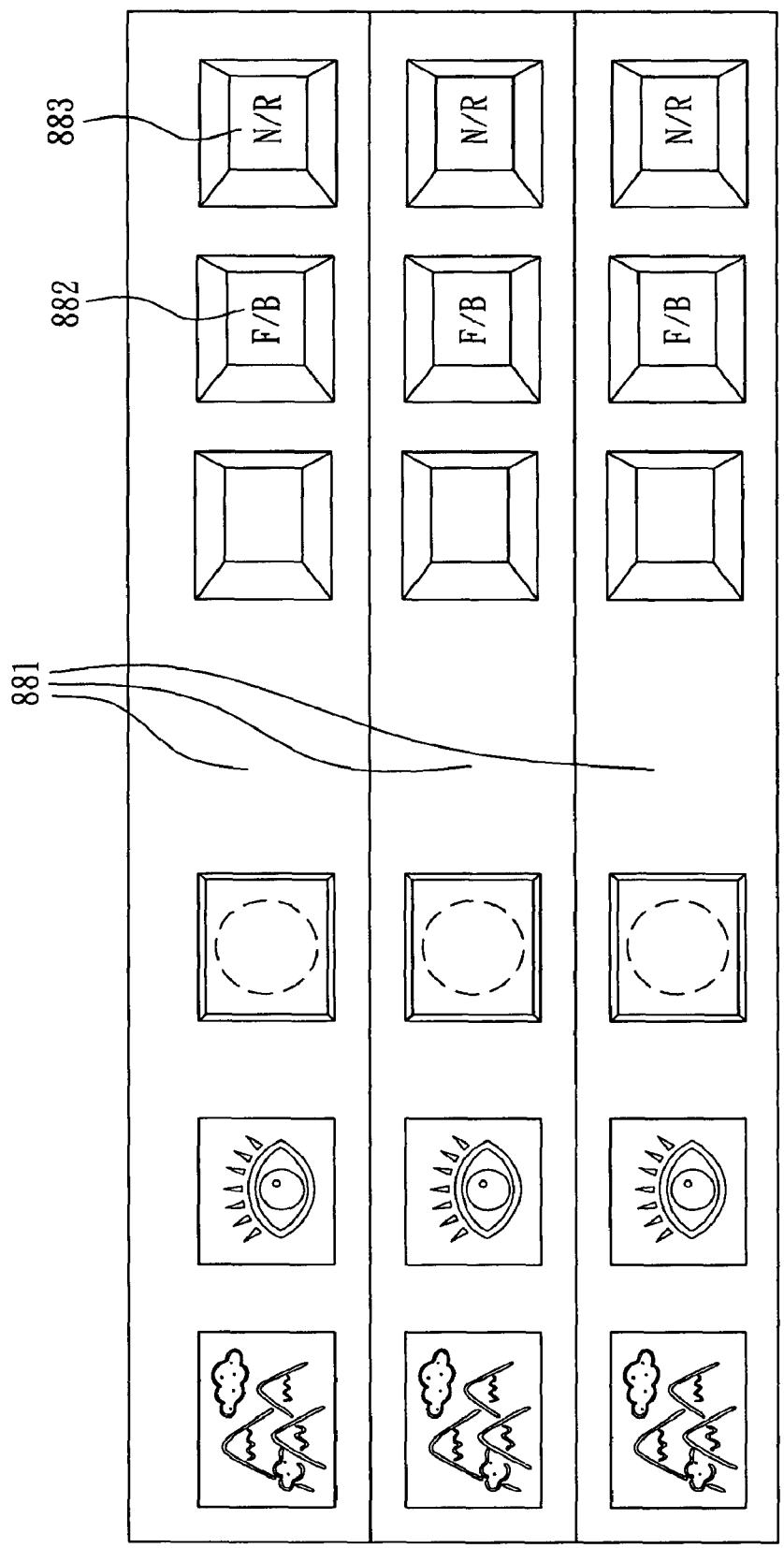
FIG. 20 is a schematic view of a layer control panel in accordance with a further preferred embodiment of the present invention.

In another preferred embodiment of the present invention as shown in FIG. 20, the layer control panel 881 adds a blurring or fine-tune switching button 882 for users to click to adjust the blurring or fine-tune of the pixels of the layered image.

In another preferred embodiment of the present invention as shown in FIG. 20, the layer control panel 881 adds a noise reduction button 883, for users to click to effectively prevent the interference of a noise to the layered image.

It is noteworthy to point out that the editing and composition described in the preferred embodiment is used for the illustration purposes only, and the persons skilled in the art should be able to use the Gaussian and Laplacian pyramid theory and the concept of the present invention to convert an original image into a plurality of scaled images and display each layered image in visual models of different scales in the original image through a layered image display interface, so that users can edit or perform a special effect to each layered image through an image characteristic editing interface. Based on different vision models, different visual effects can be simulated. All mathematical conversion programs or editing and composition programs of this sort are covered in the scope of the patent claims of the present invention.

What is claimed is:

1. A method comprising:
converting an original image into a plurality of scaled images, each scaled image being at a predetermined scale with respect to the original;
generating from the plurality of scaled images a plurality of layered images, each layered image generated by calculating the difference between two adjacent scaled images;
providing a layered image display interface for displaying simultaneously to a user at least two layered images and providing in association with each displayed layered image an edit start interface allowing the user to edit the layered image with an image characteristic editing interface;
providing the image characteristic editing interface allowing the user to adjust a characteristic of the layered image thereby generating a modified layered image.

2. The method of claim 1, further comprising:
providing a layered image editing interface allowing the user to display and edit a composed image generated in dependence upon at least a plurality of modified layered images generated by the image characteristic editing interface and the original image.

3. The method of claim 2, further comprising:
providing an image output interface for generating in dependence upon the modified plurality of layered images and the original image a new image, and converting said new image into an image file having a predetermined format.

4. An image processing apparatus comprising:
a scaled image conversion interface, for receiving an original image, converting said original image into a plurality of scaled images, each scaled image at a predetermined scale with respect to the original image, and generating from the plurality of scaled images a plurality of layered images, each layered image generated by calculating the difference between two adjacent scaled images;
a layered image display interface, including at least two layer control panels of a plurality of layer control panels, each layer control panel comprising a layer display window and an editing start button, wherein said layer display window is provided for displaying a predetermined layered image of the plurality of layered images allowing a user to examine the predetermined layered image of the plurality of layered images and said editing start button for starting an image characteristic editing interface for editing the corresponding layered image of the plurality of layered images; and
the image characteristic editing interface, including a plurality of image characteristic menus, for editing and adjusting a characteristic value of said corresponding layered image of the plurality of layered images to generate a modified layered image and thereby generate a modified plurality of layered images.

5. The apparatus of claim 4, further comprising a layered image editing interface, and said layered image editing interface comprising:
a layered image editing window, allowing the user to select and display the selected layered image of the modified plurality of layered images and a composed image generated in dependence upon at least the modified plurality of layered images and the original image;
at least one layered image characteristic adjusting button for adjusting the contrast or Gaussian variance of said layered image of the modified plurality of layered images;
at least one size adjusting button, for adjusting a process of zooming in or zooming out of said layered image of the modified plurality of layered images or said composed image; and
at least one image composition switch button, allowing the user to direct said layered image editing window to selectively show the selected layered image of the modified plurality of layered images or the composed image.

6. The apparatus of claim 4, further comprising an image output interface for generating a new image in dependence upon the modified plurality of layered images and the original image, and converting said new image into an image file with a predetermined format for at least one of saving, displaying and printing the image file.

7. The apparatus of claim 4, wherein said each layer control panel further comprises a layer display button, for controlling whether or not to display the predetermined layered image of the plurality of layered images on said layered image editing window.

8. The apparatus of claim 4, wherein said each layer control panel further comprises a mask display window and a mask menu, said mask menu being provided for the user to select and apply a mask of a plurality of masks to said predetermined layered image of the plurality of layered images and said mask display window for displaying the result of applying said selected mask to said corresponding predetermined layered image of the plurality of layered images.

9. The apparatus of claim 8, wherein said each layer control panel further comprises a mask display button, for controlling whether or not to display said selected mask in said layer editing window.

10. The apparatus of claim 4, wherein said each layer control panel further comprises at least one of a blurring and a fine-tune switching button, for adjusting a blurring and fine-tuning of pixels of said predetermined layered image of the plurality of layered images.

11. The apparatus of claim 4, wherein said each layer control panel further comprises a noise adjustment button, for adjusting the effect of noise upon the predetermined layered image of the plurality of layered images.

12. The apparatus of claim 4, wherein said each image characteristic editing interface further comprises a profile menu allowing the user to a stored existing profile for use with the predetermined layered image of the plurality of layered images.

13. The apparatus of claim 4, wherein said each image characteristic editing interface further comprises a menu relating to a LMS color space representing the responses of the three human retinal cones, the menu for selecting a variation of the LMS color space to be applied to the predetermined layered image of the plurality of layered images.

* * * * *